US011400798B2

(12) United States Patent
Mulvane et al.

(10) Patent No.: US 11,400,798 B2
(45) Date of Patent: Aug. 2, 2022

(54) WINDSHIELD QUICK ATTACH AND RELEASE SYSTEM

(71) Applicant: Taylor Made Group, LLC, Gloversville, NY (US)

(72) Inventors: Curtis Mulvane, Fort Wayne, IN (US); Brian Castleman, New Haven, IN (US)

(73) Assignee: Taylor Made Group, LLC, Gloversville, NY (US)

( * ) Notice: Subject to any disclaimer, the term of this patent is extended or adjusted under 35 U.S.C. 154(b) by 66 days.

(21) Appl. No.: 17/101,404

(22) Filed: Nov. 23, 2020

(65) Prior Publication Data

US 2021/0155083 A1 May 27, 2021

Related U.S. Application Data

(60) Provisional application No. 62/938,467, filed on Nov. 21, 2019.

(51) Int. Cl.
*B60J 1/02* (2006.01)
*B60J 1/00* (2006.01)
*B60R 21/13* (2006.01)
*B62D 25/04* (2006.01)

(52) U.S. Cl.
CPC ............ *B60J 1/006* (2013.01); *B60J 1/02* (2013.01); *B60R 21/13* (2013.01); *B62D 25/04* (2013.01)

(58) Field of Classification Search
CPC ....... B60J 1/02; B60J 1/00; B60J 1/025; B60J 1/004; B60J 1/005; B60J 1/006

USPC ................. 296/84.1, 90, 93, 96.21, 77.1, 79
See application file for complete search history.

(56) References Cited

U.S. PATENT DOCUMENTS

| | | | |
|---|---|---|---|
| 4,280,414 A | 7/1981 | Allshouse et al. | |
| 4,343,503 A * | 8/1982 | Samuelson | ............... B60J 1/02 296/96.21 |
| 5,367,977 A * | 11/1994 | Ellis | ....................... A44B 19/16 114/361 |
| 5,658,035 A * | 8/1997 | Armstrong | ............... B62J 17/04 296/78.1 |
| 5,784,982 A | 7/1998 | Erskine | |
| 5,954,385 A * | 9/1999 | Moore | ....................... B60J 1/06 24/336 |
| 5,975,615 A * | 11/1999 | Showalter | .................. B60J 1/06 296/84.1 |
| 6,176,538 B1 * | 1/2001 | Lawson | ................... B62J 17/04 296/78.1 |
| 6,453,841 B1 | 9/2002 | Shearer et al. | |
| 6,877,788 B2 | 4/2005 | Graham | |
| 6,895,885 B2 | 5/2005 | Shearer et al. | |
| 7,032,915 B2 | 4/2006 | Bedard et al. | |
| 7,147,274 B2 * | 12/2006 | Yamamoto | ................ B60J 1/20 296/84.1 |

(Continued)

*Primary Examiner* — Dennis H Pedder
(74) *Attorney, Agent, or Firm* — Nixon & Vanderhye P.C.

(57) ABSTRACT

An attach and release system for securing a windshield to a pillar includes an extrusion that is securable to the windshield adjacent the pillar. The extrusion has a connection tab and a seal tab. A bulb seal is connected to the seal tab, and a clamp includes a pillar section securable to the pillar and a connector section securable to the connection tab. The system and method facilitate windshield installation and removal and are suited for a utility task/terrain vehicle (UTV) as part of its rollover protection structure (ROPS).

17 Claims, 9 Drawing Sheets

(56) References Cited

U.S. PATENT DOCUMENTS

| | | | | |
|---|---|---|---|---|
| 7,165,802 B1* | 1/2007 | Flynn | ............... | B60J 1/06 296/87 |
| 7,665,792 B1* | 2/2010 | Flynn | ............... | B60J 1/06 296/87 |
| 7,673,923 B2* | 3/2010 | Reese | ............... | B60J 1/06 296/84.1 |
| 8,087,711 B1* | 1/2012 | Mauro | ............... | B60J 1/06 296/89 |
| 8,936,296 B1* | 1/2015 | Fedders | ............... | B60J 1/06 296/85 |
| 9,045,022 B2* | 6/2015 | Tyrer | ............... | B60J 1/06 |
| 9,126,656 B2 | 9/2015 | Griffith | | |
| 9,132,716 B1* | 9/2015 | Mauro | ............... | B60J 1/06 |
| 9,233,734 B2 | 1/2016 | Erskine et al. | | |
| 9,428,152 B2 | 8/2016 | Bender | | |
| 9,499,029 B2* | 11/2016 | Gaudet | ............... | B60J 1/06 |
| 10,947,760 B2* | 3/2021 | Kim | ............... | B60J 1/06 |
| 2008/0303308 A1* | 12/2008 | Hanson | ............... | B60J 1/06 296/87 |
| 2014/0203588 A1* | 7/2014 | Tyrer | ............... | B60J 5/0487 296/79 |
| 2015/0165876 A1* | 6/2015 | Bender | ............... | B60J 1/006 29/410 |
| 2016/0001639 A1* | 1/2016 | Mauro | ............... | B60J 1/007 296/96.21 |
| 2018/0043755 A1* | 2/2018 | Ye | ............... | B60J 1/2097 |
| 2018/0244133 A1* | 8/2018 | Luo | ............... | B60J 1/025 |
| 2020/0047594 A1* | 2/2020 | Gulledge | ............... | B60J 1/06 |
| 2020/0062087 A1* | 2/2020 | McWhorter | ............... | F16M 13/022 |

* cited by examiner

WINDSHIELD QUICK ATTACH AND RELEASE SYSTEM

CROSS-REFERENCES TO RELATED APPLICATIONS

This application claims the benefit of U.S. Provisional Patent Application No. 62/938,467, filed Nov. 21, 2019, the entire content of which is herein incorporated by reference.

STATEMENT REGARDING FEDERALLY SPONSORED RESEARCH OR DEVELOPMENT (NOT APPLICABLE)

BACKGROUND

The invention relates to an attach and release system for a laminated windshield and, more particularly, to a quick attach and release system for a windshield on a utility task/terrain vehicle (UTV) as part of its rollover protection structure (ROPS).

SUMMARY

The quick attach and release system of the described embodiments is suitable for a windshield on a UTV as part of its rollover protection structure. An extrusion is secured along the pillar sides of the windshield. In some embodiments, the extrusion may include four pressed-in dowel pins and two tapped holes. The windshield and a standard marine vinyl extrusion are sandwiched into the extrusion. A bulb seal may serve to seal the joint between the extrusion and the pillar. A second extrusion in the form of a clamp may be provided with two slots and a clearance hole machined into the clamp. The clamp may be secured behind the pillar and located by the dowels in the windshield extrusion. The clamp is pushed up on the pillar, and the angled slots serve to draw the windshield toward the pillar. A threaded knob or the like may be used to secure the position of the clamp.

In an exemplary embodiment, an attach and release system secures a windshield to a pillar. The attach and release system includes an extrusion that is securable to the windshield adjacent the pillar and has a connection tab and a seal tab, a bulb seal connected to the seal tab, and a clamp including a pillar section securable to the pillar and a connector section securable to the connection tab.

The connection tab may include a dowel pin and a tapped hole. The clamp may include a slot and a clearance hole in the connector section, where the dowel pin engages the slot, and with the dowel pin fully inserted into the slot, the clearance hole is aligned with the tapped hole. In this context, the system may include a connector secured through the clearance hole and the tapped hole. In some embodiments, the slot may be angled relative to a longitudinal axis of the pillar section. In some embodiments, the clamp may include two slots in the connector section.

The system may also include a seal extrusion secured to the seal tab and extending along a length of the seal tab, where the bulb seal is integral with the seal extrusion. In this context, the seal extrusion may include a grip section fit directly over the seal tab and the bulb seal extending outward from the grip section.

The bulb seal may be sandwiched between the seal tab and the pillar.

The connector section of the clamp may define a longitudinal slot, where the connection tab is secured in the longitudinal slot.

The pillar section may be shaped at least partially corresponding to an exterior shape of the pillar.

In another exemplary embodiment, a windshield assembly is securable to a vehicle having two forward pillars and includes a windshield, and the attach and release system of the described embodiments connected between the windshield and each of the two forward pillars.

In yet another exemplary embodiment, a method of securing a windshield to a pillar using the attach and release system includes the steps of (a) attaching the extrusion to the windshield; (b) attaching the bulb seal on the seal tab; (c) attaching the connector section of the clamp on the connection tab while inserting the dowel pin of the connection tab into the slot in the clamp; (d) attaching the pillar section of the clamp onto the pillar; (e) displacing the clamp along and relative to the pillar section until the clearance hole in the slot is aligned with the tapped hole in the connection tab; and (f) securing a connector through the clearance hole and the tapped hole.

Step (d) may include sandwiching the bulb seal between the seal tab and the pillar.

BRIEF DESCRIPTION OF THE DRAWINGS

These and other aspects and advantages will be described in detail with reference to the accompanying drawings, in which.

DETAILED DESCRIPTION

Figure 1:
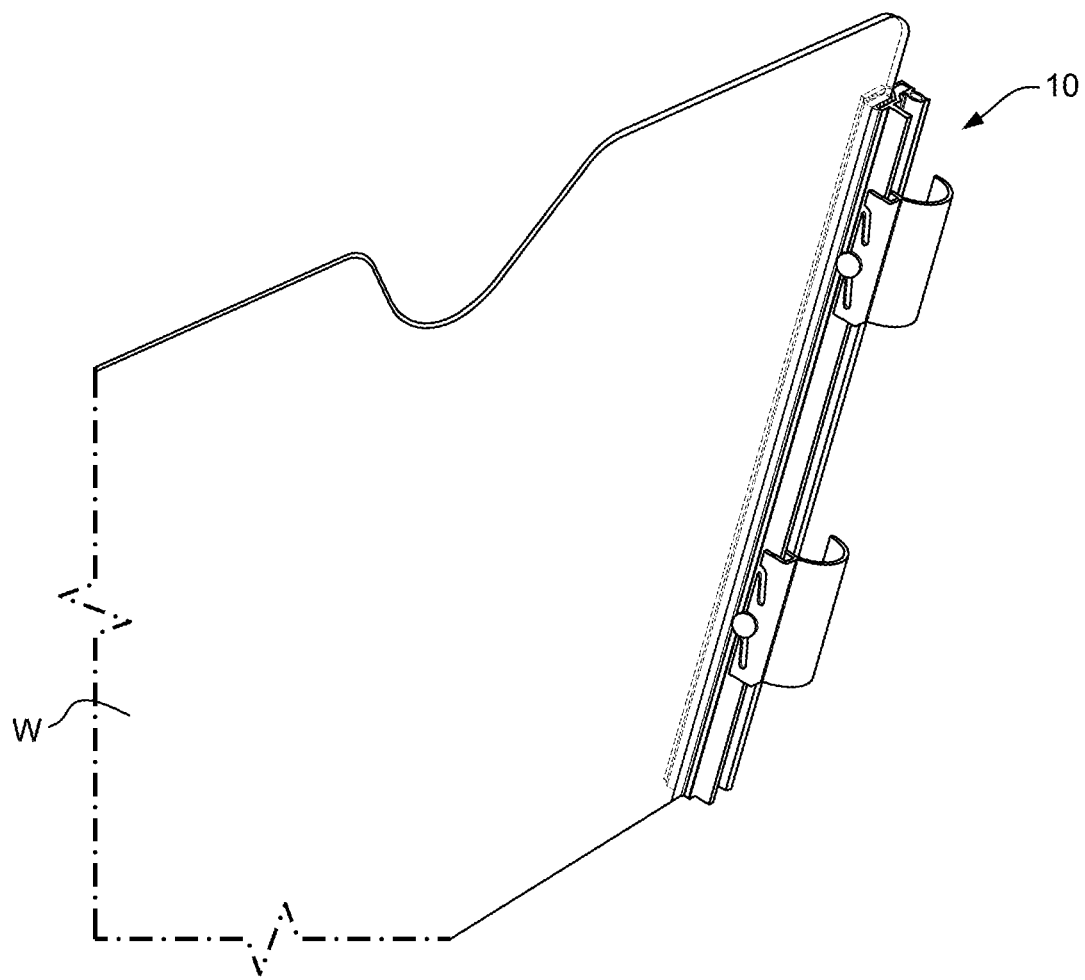
FIG. 1 shows the attach and release system of the described embodiments secured on one side of a windshield.

FIG. 1 shows the quick attach and release system 10 secured on a pillar side of a laminated windshield W. Similar components can be attached on the opposite side of the windshield W to secure the windshield to the opposite pillar.

Figure 2:
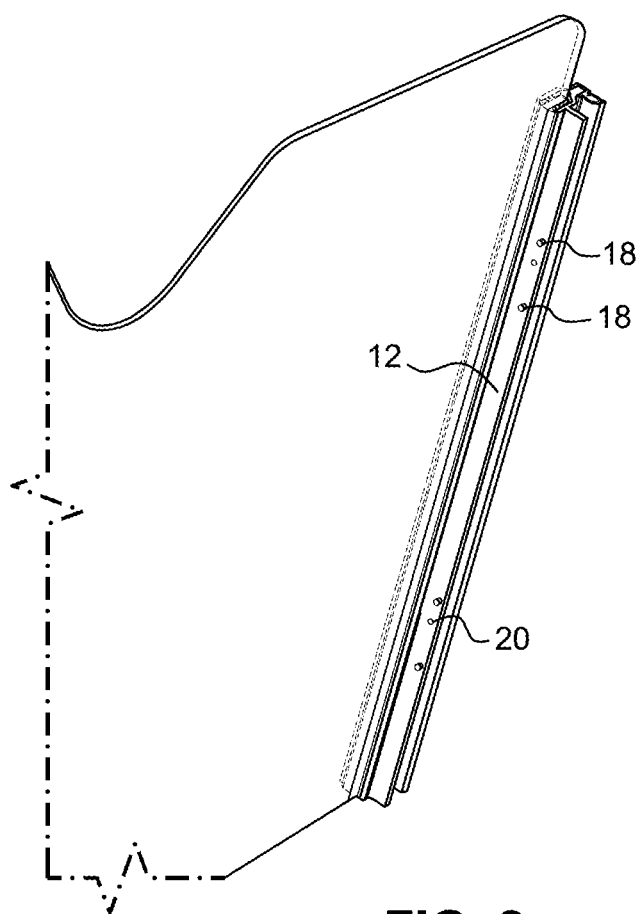
FIGS. 2 and 3 show details of the extrusion.
Figure 3:
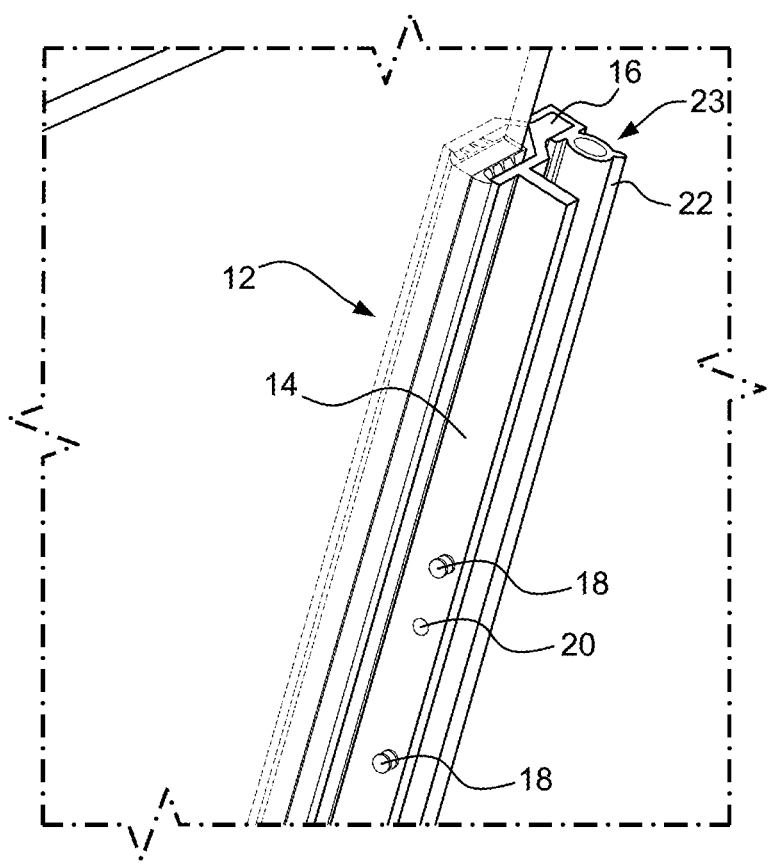
Figure 4:
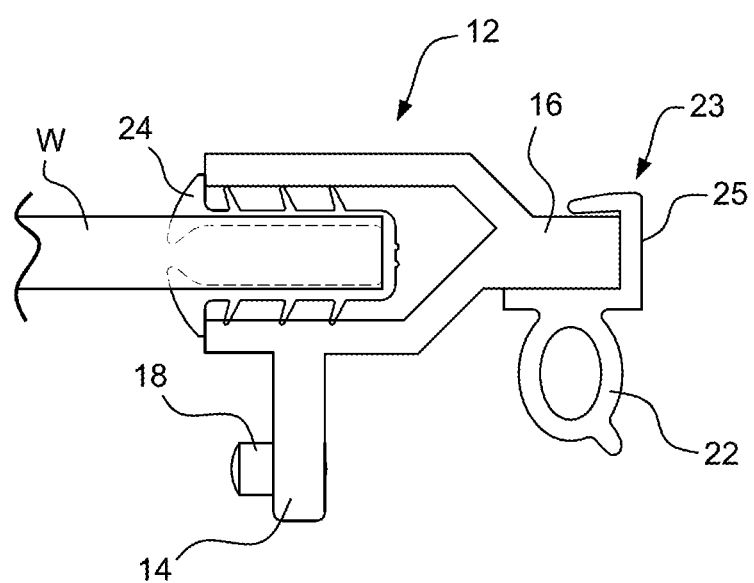
FIG. 4 is a plan view of the extrusion secured on a side edge of the windshield.

With reference to FIGS. 2-4, the system includes an extrusion 12 that is securable to the windshield W adjacent the pillar. The extrusion 12 includes a connection tab 14 and a seal tab 16. The connection tab 14 and the seal tab 16 may be oriented orthogonally as shown. The connection tab 14 is provided with a plurality of pressed-in dowel pins 18 and includes at least one tapped hole 20. In an exemplary embodiment, the connection tab 14 is provided with four dowel pins 18 and two tapped holes 20.

A bulb seal 22 is connected to the seal tab 16. The bulb seal 22 forms part of a seal extrusion 23 secured on the seal tab 16. As shown in FIGS. 2 and 3, the seal extrusion 23 extends along a length of the seal tab 16. The seal extrusion 23 may be provided with a grip section 25 (FIG. 4) that fits directly over the seal tab 16, where the bulb seal 22 extends outward from the grip section 25.

With reference to FIG. 4, the windshield W and a standard glazing vinyl extrusion 24 are sandwiched into the extrusion 12. The extrusion 12 and standard glazing vinyl extrusion 24 may be secured to the windshield via an adhesive or the like.

Figure 5:
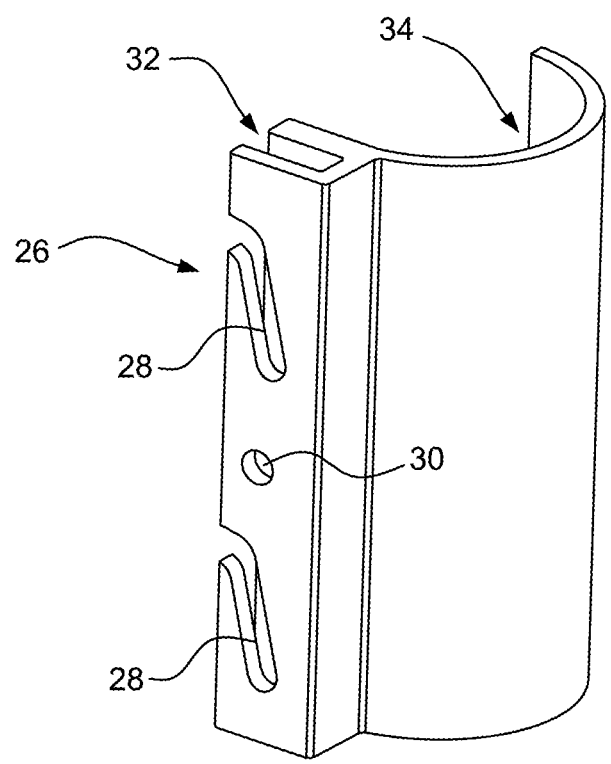
FIG. 5 is a perspective view of a clamp securable to a connection tab on the extrusion.
Figure 6:
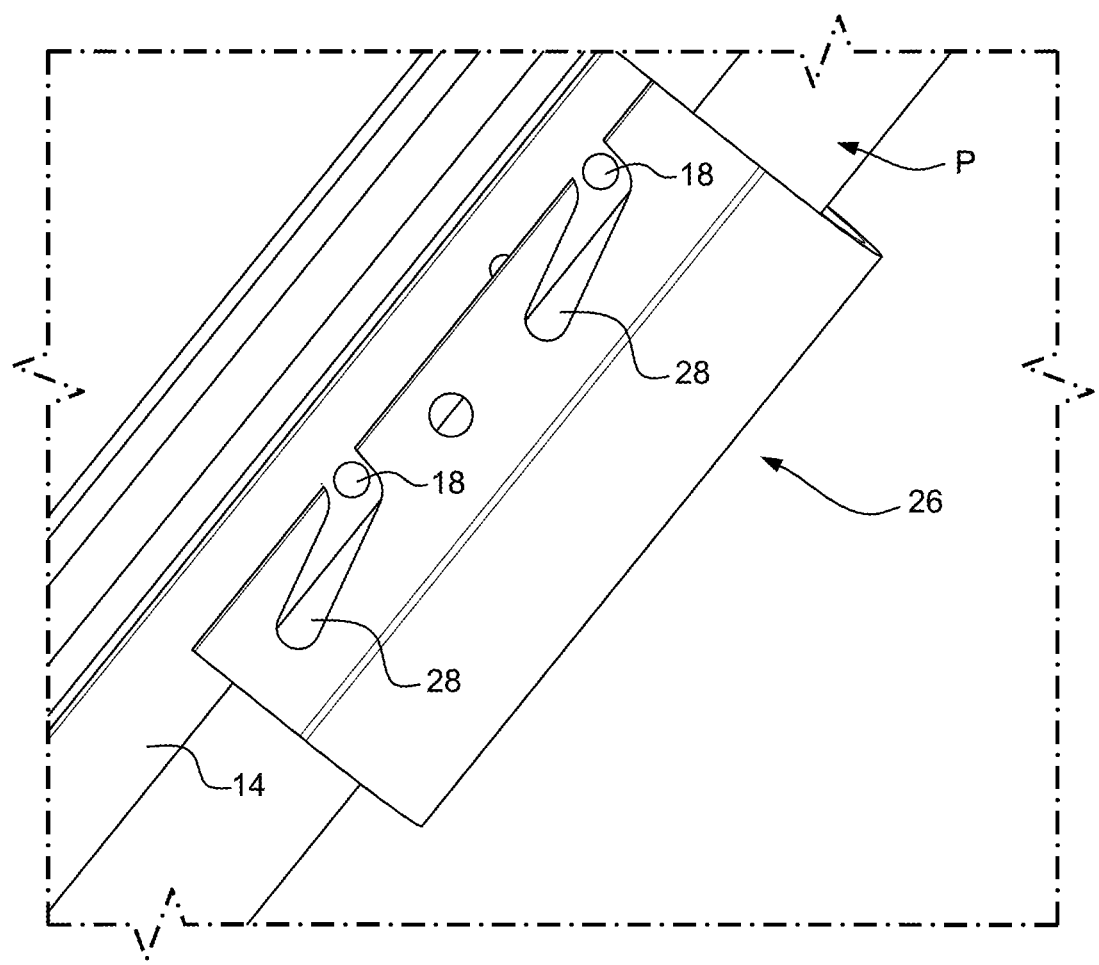
FIGS. 6 and 7 illustrate the connection of the attach and release system to a pillar.
Figure 7:
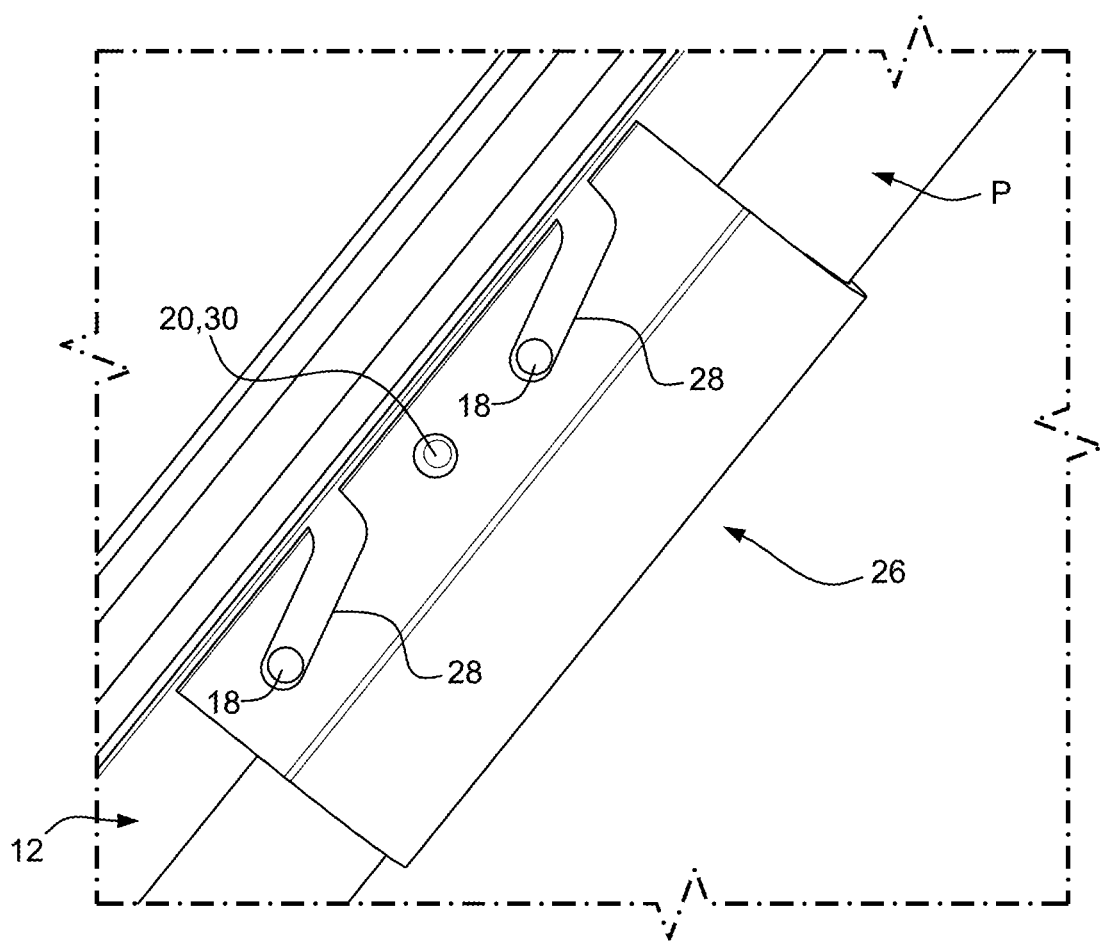

FIG. 5 shows a clamp 26 made from a second extrusion. The clamp 26 includes one or more slots 28 and a clearance hole 30 machined into the clamp 26. As shown, in some embodiments, each clamp may include two slots 28. As shown in FIGS. 5-7, the slots 28 may be angled relative to a longitudinal axis of the pillar section 34. The slots 28 and clearance hole 30 are formed in a connector section 32 of the clamp 26. The connector section 32 is securable to the connection tab 14 of the extrusion 12. That is, the connector section 32 of the clamp 26 may define a longitudinal slot, and the connection tab 14 of the extrusion 12 may be secured in the longitudinal slot.

The clamp 36 also includes a pillar section 34 that is securable to the pillar. The pillar section 34 is shaped at least partially corresponding to an exterior shape of the pillar P. In the embodiment shown in FIG. 5, the pillar section 34 essentially defines a half-circle to fit over a correspondingly shaped pillar. Other shapes may be utilized for differently-shaped pillars.

With reference to FIGS. 6 and 7, the pillar section 34 of the clamp 26 is fit over the pillar P, and openings of the slots 28 are aligned with the dowel pins 18. The connector section 32 of the clamp 26 is fit over the connection tab 14 of the extrusion 12. As shown in FIG. 7, the clamp 26 is subsequently pushed upward, and the slots 28 act as cams to draw the extrusion 12 (and the windshield W) toward the pillar P via the dowels 18.

Figure 8:
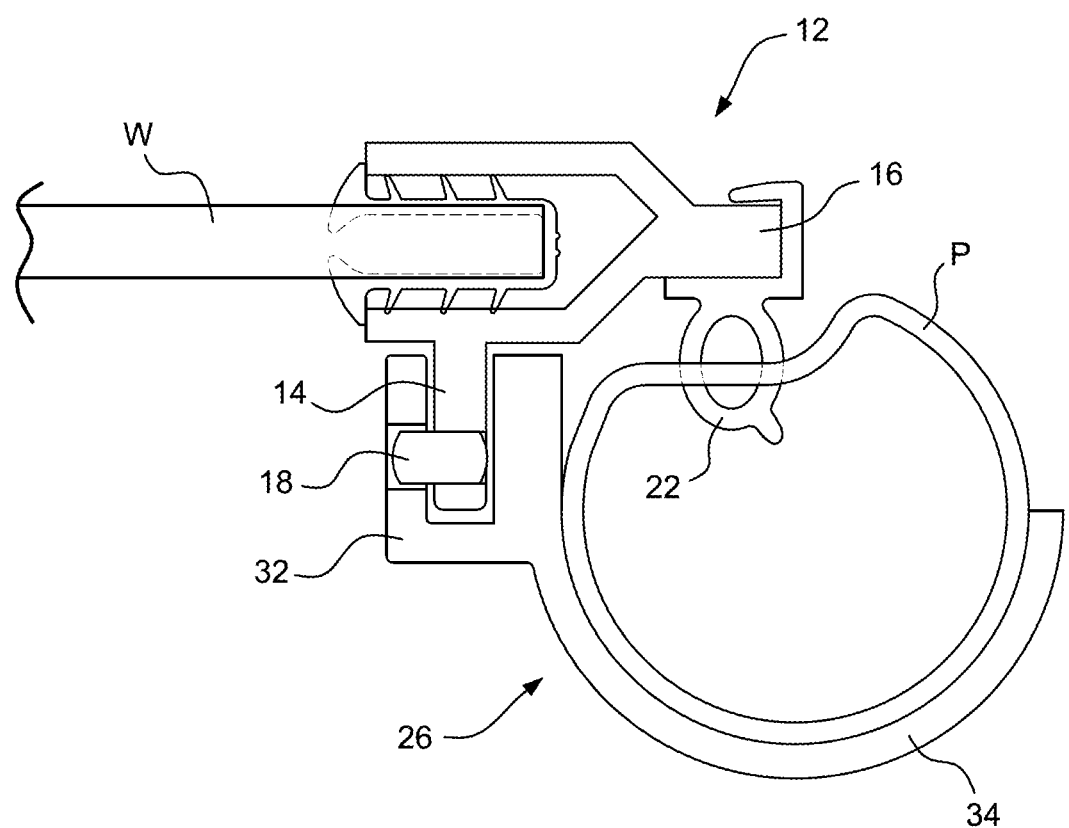
FIG. 8 is a plan view with the system installed including the position of the pillar.
Figure 9:
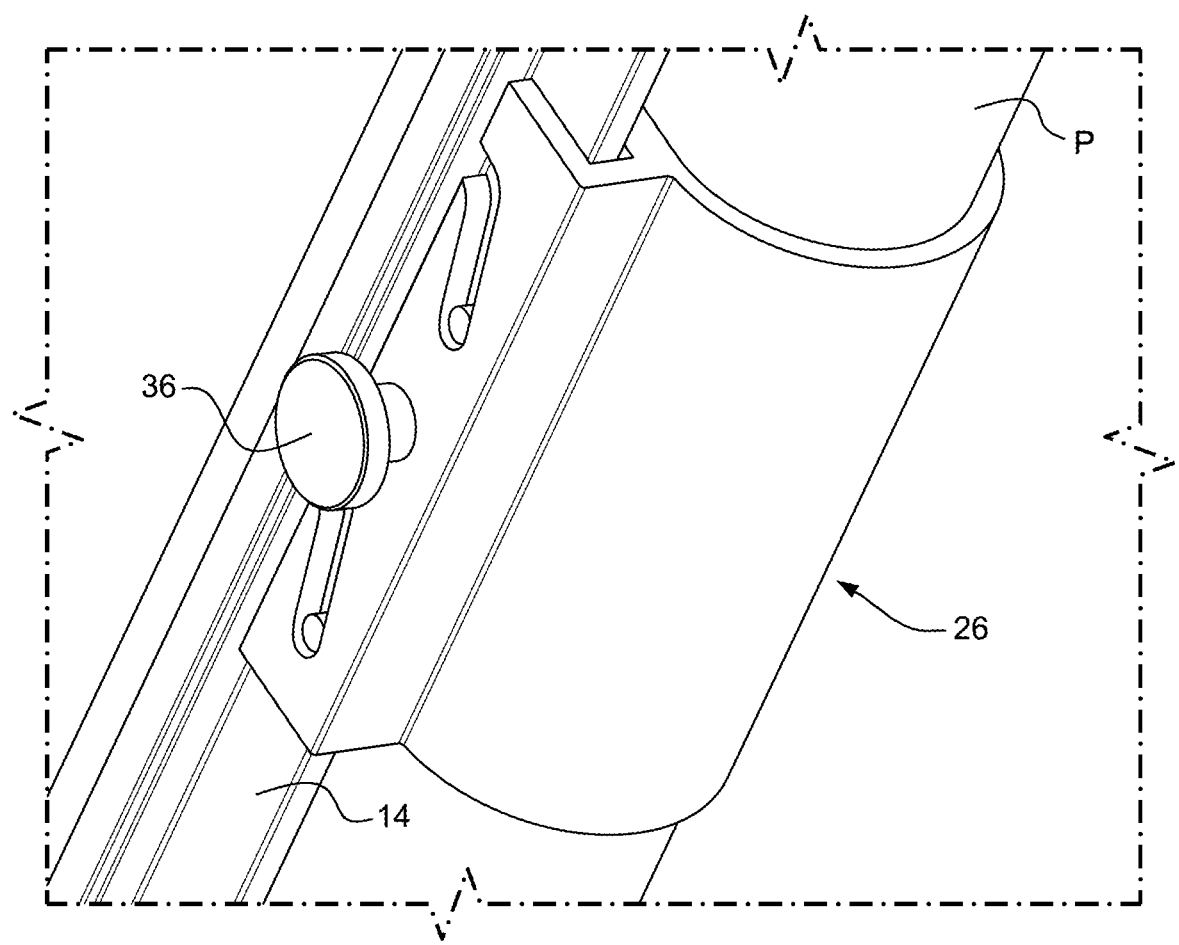
FIG. 9 shows a connected position including a connector that secures the clamp in place.

FIG. 8 is a sectional view with the clamp 26 fully engaged on the pillar P and the extrusion 12. The bulb seal 22 is sandwiched between the seal tab 16 and the pillar P. When the clamp 26 is in the seated position shown in FIG. 7, there will be a 50% compression in the bulb seal 22 by the pillar P. Additionally, in the seated position shown in FIG. 7, the tapped hole 20 and the clearance hole 30 are aligned. With reference to FIG. 9, once aligned, a threaded knob 36 or other suitable connector can be secured through the clearance hole 30 into the tapped hole 20. The connector 36 secures the position of the clamp 26.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An attach and release system for securing a windshield to a pillar, the attach and release system comprising:
an extrusion securable to the windshield adjacent the pillar and including a connection tab and a seal tab;
a bulb seal connected to the seal tab; and
a clamp including a pillar section securable to the pillar and a connector section securable to the connection tab.

2. An attach and release system according to claim 1, the connection tab including a dowel pin and a tapped hole.

3. An attach and release system according to claim 2, the clamp including a slot and a clearance hole in the connector section, wherein the dowel pin engages the slot, and with the dowel pin fully inserted into the slot, the clearance hole is aligned with the tapped hole.

4. An attach and release system according to claim 3, further comprising a connector secured through the clearance hole and the tapped hole.

5. An attach and release system according to claim 3, wherein the slot is angled relative to a longitudinal axis of the pillar section.

6. An attach and release system according to claim 3, wherein the clamp includes two slots in the connector section.

7. An attach and release system according to claim 1, further comprising a seal extrusion secured to the seal tab and extending along a length of the seal tab, wherein the bulb seal is integral with the seal extrusion.

8. An attach and release system according to claim 7, wherein the seal extrusion comprises a grip section fit directly over the seal tab, and the bulb seal extending outward from the grip section.

9. An attach and release system according to claim 1, wherein the bulb seal is sandwiched between the seal tab and the pillar.

10. An attach and release system according to claim 1, wherein the connector section of the clamp defines a longitudinal slot, and wherein the connection tab is secured in the longitudinal slot.

11. An attach and release system according to claim 1, wherein the pillar section is shaped at least partially corresponding to an exterior shape of the pillar.

12. An attach and release system for securing a windshield to a pillar, the attach and release system comprising:
an extrusion securable to the windshield adjacent the pillar and including a connection tab and a seal tab, the connection tab including a dowel pin and a tapped hole;
a bulb seal connected to the seal tab;
a clamp including a pillar section securable to the pillar and a connector section securable to the connection tab, the clamp including a slot and a clearance hole in the connector section,
wherein the dowel pin engages the slot, and with the dowel pin fully inserted into the slot, the clearance hole is aligned with the tapped hole; and
a connector secured through the clearance hole and the tapped hole.

13. An attach and release system according to claim 12, wherein the slot is angled relative to a longitudinal axis of the pillar section thereby acting as a cam such that displacement of the clamp along the pillar serves to draw the windshield toward the pillar.

14. An attach and release system according to claim 12, wherein the connector section of the clamp defines a longitudinal slot, and wherein the connection tab is secured in the longitudinal slot.

15. A windshield assembly securable to a vehicle having two forward pillars, the windshield assembly comprising:
a windshield; and
the attach and release system according to claim 1 connected between the windshield and each of the two forward pillars.

16. A method of securing a windshield to a pillar using an attach and release system including an extrusion with a connection tab and a seal tab, the connection tab including a dowel pin and a tapped hole, a bulb seal, and a clamp including a pillar section and a connector section, the clamp including a slot and a clearance hole in the connector section, the method comprising:
(a) attaching the extrusion to the windshield;
(b) attaching the bulb seal on the seal tab;
(c) attaching the connector section of the clamp on the connection tab while inserting the dowel pin of the connection tab into the slot in the clamp;
(d) attaching the pillar section of the clamp onto the pillar;

(e) displacing the clamp along and relative to the pillar section until the clearance hole in the slot is aligned with the tapped hole in the connection tab; and (f) securing a connector through the clearance hole and the tapped hole.

17. A method according to claim 16, wherein step (d) comprises sandwiching the bulb seal between the seal tab and the pillar.

\* \* \* \* \*